US007866866B2

(12) United States Patent
Wahlstrom

(10) Patent No.: US 7,866,866 B2
(45) Date of Patent: Jan. 11, 2011

(54) FIBER OPTICAL DISPLAY SYSTEMS AND RELATED METHODS, SYSTEMS, AND COMPUTER PROGRAM PRODUCTS

(75) Inventor: Per Magnus Orjan Wahlstrom, Malmö (SE)

(73) Assignee: Sony Ericsson Mible Communications AB, Lund (SE)

( * ) Notice: Subject to any disclaimer, the term of this patent is extended or adjusted under 35 U.S.C. 154(b) by 1067 days.

(21) Appl. No.: 11/281,031

(22) Filed: Nov. 17, 2005

(65) Prior Publication Data
US 2007/0081354 A1 Apr. 12, 2007

Related U.S. Application Data

(60) Provisional application No. 60/725,029, filed on Oct. 7, 2005.

(51) Int. Cl.
*F21V 8/00* (2006.01)
(52) U.S. Cl. ........................ 362/554; 362/555; 362/559
(58) Field of Classification Search ................. 362/554, 362/551, 555, 559
See application file for complete search history.

(56) References Cited

U.S. PATENT DOCUMENTS

| 3,535,018 | A | * | 10/1970 | Vasilatos | 385/115 |
| 4,141,058 | A | * | 2/1979 | Mizohata et al. | 362/558 |
| 4,855,740 | A |  | 8/1989 | Muramatsu et al. |  |
| 5,160,565 | A | * | 11/1992 | Chazalon et al. | 156/242 |
| 6,217,188 | B1 | * | 4/2001 | Wainwright et al. | 362/103 |

FOREIGN PATENT DOCUMENTS

| DE | 2 131 924 | 1/1973 |
| GB | 2 275 799 A | 9/1994 |
| WO | WO 99/39259 | 8/1999 |

* cited by examiner

*Primary Examiner*—Sharon E Payne
(74) *Attorney, Agent, or Firm*—Myers Bigel Sibley & Sajovec

(57) ABSTRACT

A key system includes a display surface, a light source, and a plurality of optical fibers having first and second ends and a longitudinal sheath. The plurality of optical fibers are connected to the light source at the first ends thereof and configured to transmit light from the light source to the display surface.

19 Claims, 9 Drawing Sheets

FIBER OPTICAL DISPLAY SYSTEMS AND RELATED METHODS, SYSTEMS, AND COMPUTER PROGRAM PRODUCTS

RELATED APPLICATIONS

This application claims priority to U.S. Provisional Application Ser. No. 60/725,029 filed Oct. 7, 2005, the disclosure of which is hereby incorporated by reference in its entirety.

BACKGROUND OF THE INVENTION

The present invention relates to the field of keypads in general and more particularly, to keys for displaying multiple symbols, for example, on a mobile terminal.

As consumer preferences and improved technology results in smaller electronic devices, the space available on electronic devices for keypads and other user input interfaces is increasingly limited. Keypads and touch sensitive screens have been engineered for space efficiency in these environments. However, the functionality and/or ease of use may be compromised in an effort to decrease the size of the user interface.

For example, portable or handheld devices, such as a mobile terminal, may provide various functionalities or operational modes, such as communication, games, and multi-media rendering. To decrease the number of user keys used in a keypad, a particular key may be used in connection with different functionalities depending on the operational mode. For example, in the communication mode, a single key may be used for entering a "1", whereas the same key in the multi-media mode may be used for initiating a "play" command for rendering multi-media data.

Multifunctional keys may be confusing to a user. Several symbols may need to be provided in a relatively small area. This may be a problem as the physical area available in a portable communication apparatus for each key is limited. As a result, the symbols may be relatively small and difficult to read. Furthermore, it may be difficult to distinguish the symbols from each other and/or be confusing for the user because the functionality of the key may be unclear.

SUMMARY OF THE INVENTION

According to embodiments of the invention, a display system includes a display surface and at least one light source. A plurality of optical fibers is configured to transmit light from the at least one light source to the display surface. A controller is configured to control the light source to selectively provide each of first and second alternative images at the display surface.

According to further embodiments of the invention, methods of displaying images in a display system are provided. The display system includes a display surface and at least one light source. A plurality of optical fibers is configured to transmit light from the at least one light source to the display surface. The method includes controlling the light source to provide a first image at the display surface, and thereafter controlling the light source to provide a second alternative image at the display surface.

According to still further embodiments of the invention, a computer program product for controlling a display system is provided. The display system includes a display surface and at least one light source. A plurality of optical fibers is configured to transmit light from the at least one light source to the display surface. The computer program product includes a computer readable medium having computer readable program code embodied therein. The computer readable program code includes computer readable program code that computer readable program code that controls the at least one light source to provide a first image at the display surface; and computer readable program code that controls the at least one light source to thereafter provide a second alternative image at the display surface.

According to still further embodiments of the invention, a mobile terminal includes a button key system. The button key system includes a key member that has a display surface. The key system further includes at least one light source and a plurality of optical fibers configured to transmit light from the at least one light source to the display surface. A controller is configured to control the at least one light source to selectively provide each of first and second alternative images at the display surface.

DETAILED DESCRIPTION OF EMBODIMENTS OF THE INVENTION

Figure 1:
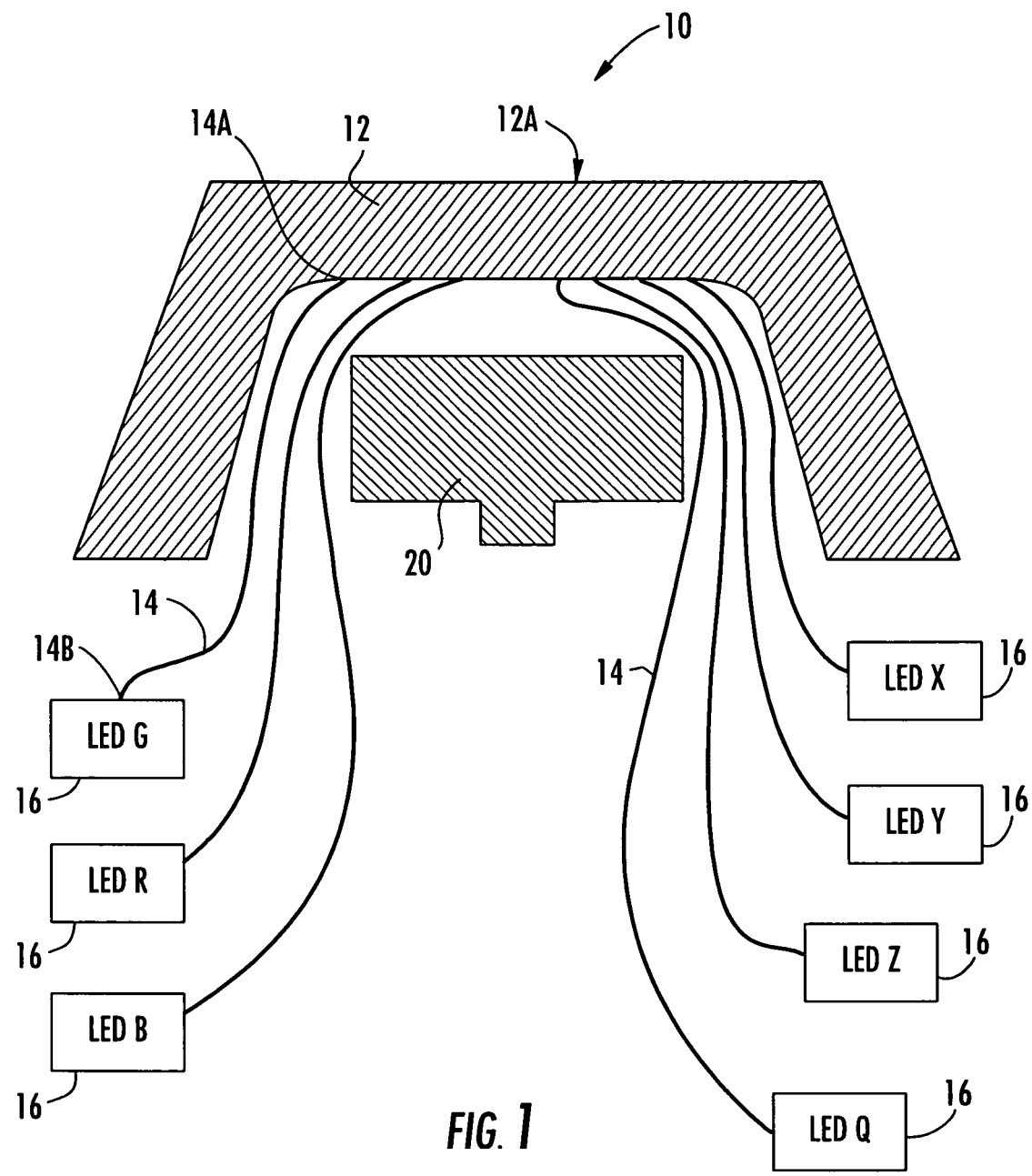
FIG. 1 is a cross sectional view of a fiber optic key according to some embodiments of the invention.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art.

Like numbers refer to like elements throughout. As used herein the term "comprising" or "comprises" is open-ended, and includes one or more stated elements, steps and/or functions without precluding one or more unstated elements, steps and/or functions. As used herein the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a "first" element, component, region, layer or section discussed below could also be termed a "second" element, component, region, layer or section without departing from the teachings of the present invention. The sequence of operations (or steps) is not limited to the order presented in the claims or figures unless specifically indicated otherwise.

Embodiments according to the present invention are described with reference to block diagrams and/or operational illustrations of methods, mobile terminals, and computer program products. It is to be understood that each block of the block diagrams and/or operational illustrations, and combinations of blocks in the block diagrams and/or operational illustrations, can be implemented by radio frequency, analog and/or digital hardware, and/or computer program instructions. These computer program instructions may be provided to a processor circuit of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

As used herein, a "mobile terminal" includes, but is not limited to, a terminal that is configured to receive communication signals via a wireless interface from, for example, a cellular network, a Wide Area Network, wireless local area network (WLAN), a GPS system, and/or another RF communication device. Example mobile terminals include, but are not limited to, a cellular mobile terminal; a GPS positioning receiver; an acceleration measurement device with a wireless receiver; a personal communication terminal that may combine a cellular mobile terminal with data processing, facsimile and data communications capabilities; a personal data assistance (PDA) that can include a wireless receiver, pager, Internet/intranet access, local area network interface, wide area network interface, Web browser, organizer, and/or calendar; and a mobile or fixed computer or other device that includes a wireless receiver.

With reference to FIG. 1, a fiber optic key 10 is shown. The key 10 includes a key member 12 having a display surface 12A, a plurality of optical fibers 14, a plurality of LEDs 16 (labeled LED Q, LED X, LED Y, LED Z, LED G, LED R and LED B) and a key activator 20. When a sufficient force is applied to the key surface 12, the key activator 20 is activated to provide a signal or other indication to an electronic device indicating that a user has selected the key. Each of the optical fibers 14 includes an end 14B connected to a respective one of the LEDs 16 and another end 14A connected to the display surface 12A. The LEDs 16 may be positioned in any suitable location on an electronic device.

The LEDs 16 may each emit one or more different colors into respective ones of the fibers 14 so that the fibers 14 transmit light from the LEDs. Accordingly, the fiber ends 14A emit the color of light from the respective LED 16 to which the fiber is attached. The LEDs 16 may be single wavelength light LEDs or multi-wavelength light LEDs. As illustrated in FIG. 1, LED Q emits either red, blue or green light; LED X emits red or green light; LED Y emits red or blue light; LED Z emits red, blue or green light; LED G emits green light; LED R emits red light; and LED B emits blue light.

Figure 2A:
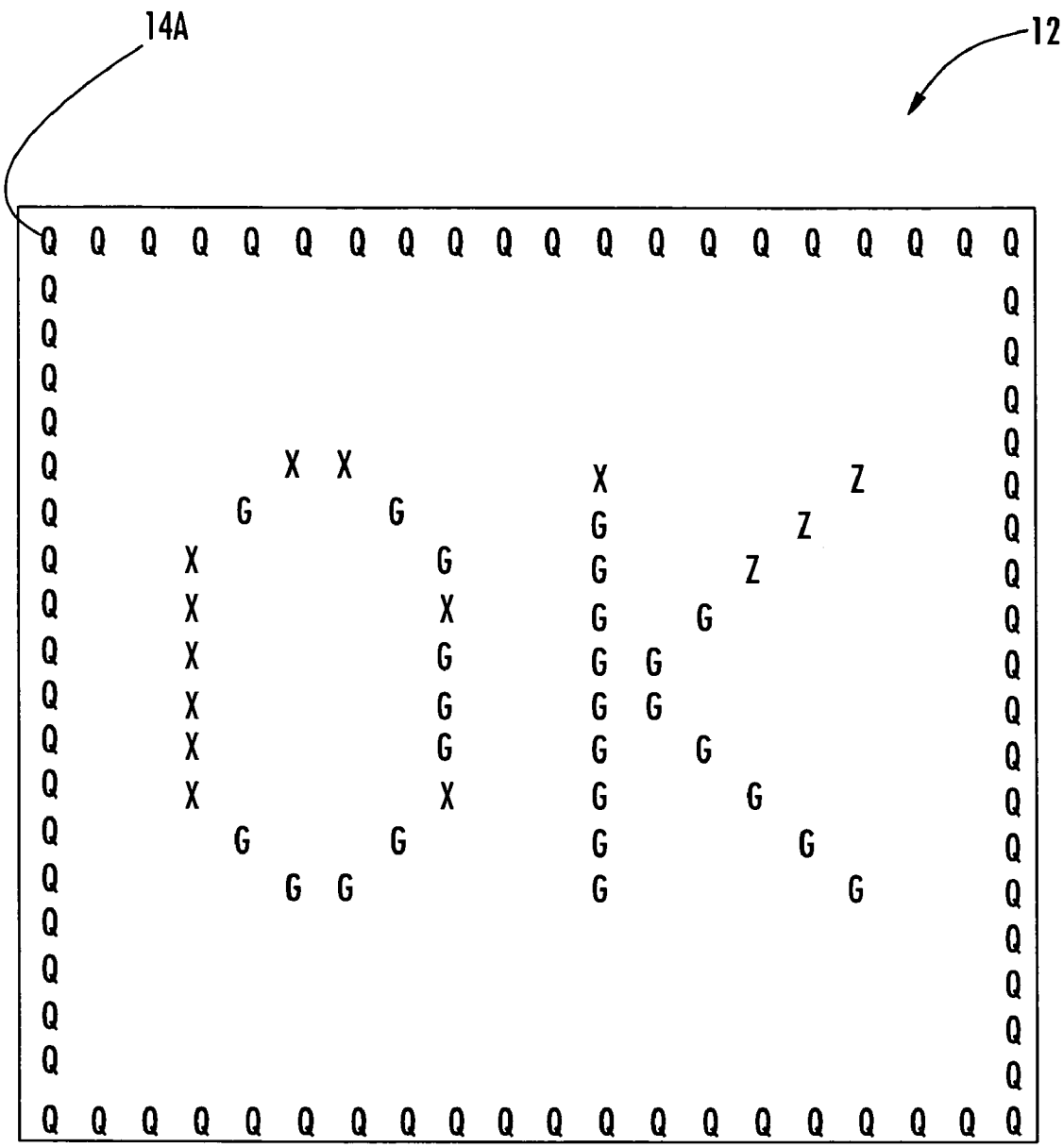
FIGS. 2A-2C are top views of the fiber optic key of FIG. 2 illustrating various fiber illumination combinations.
Figure 2B:
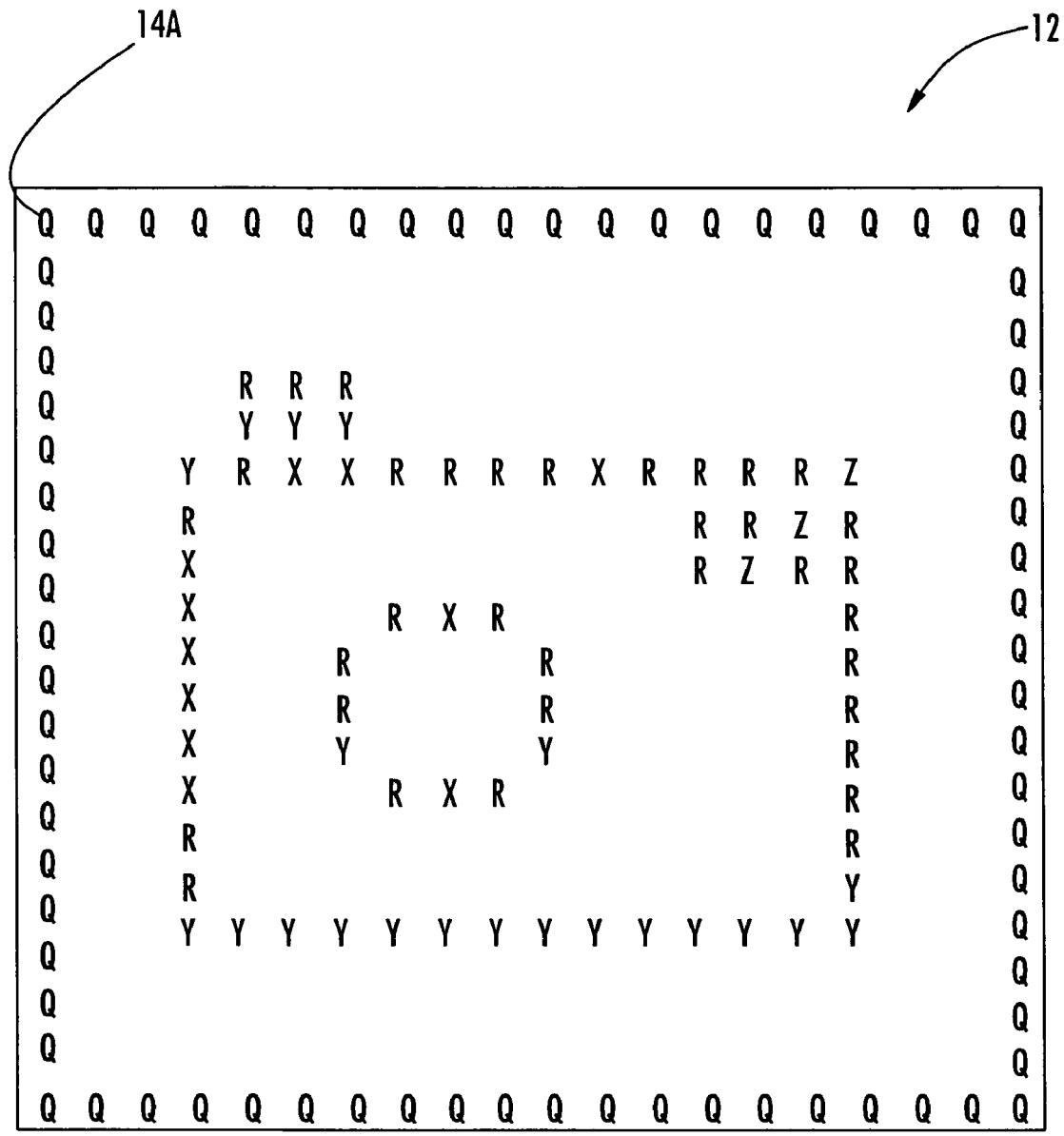
Figure 2C:
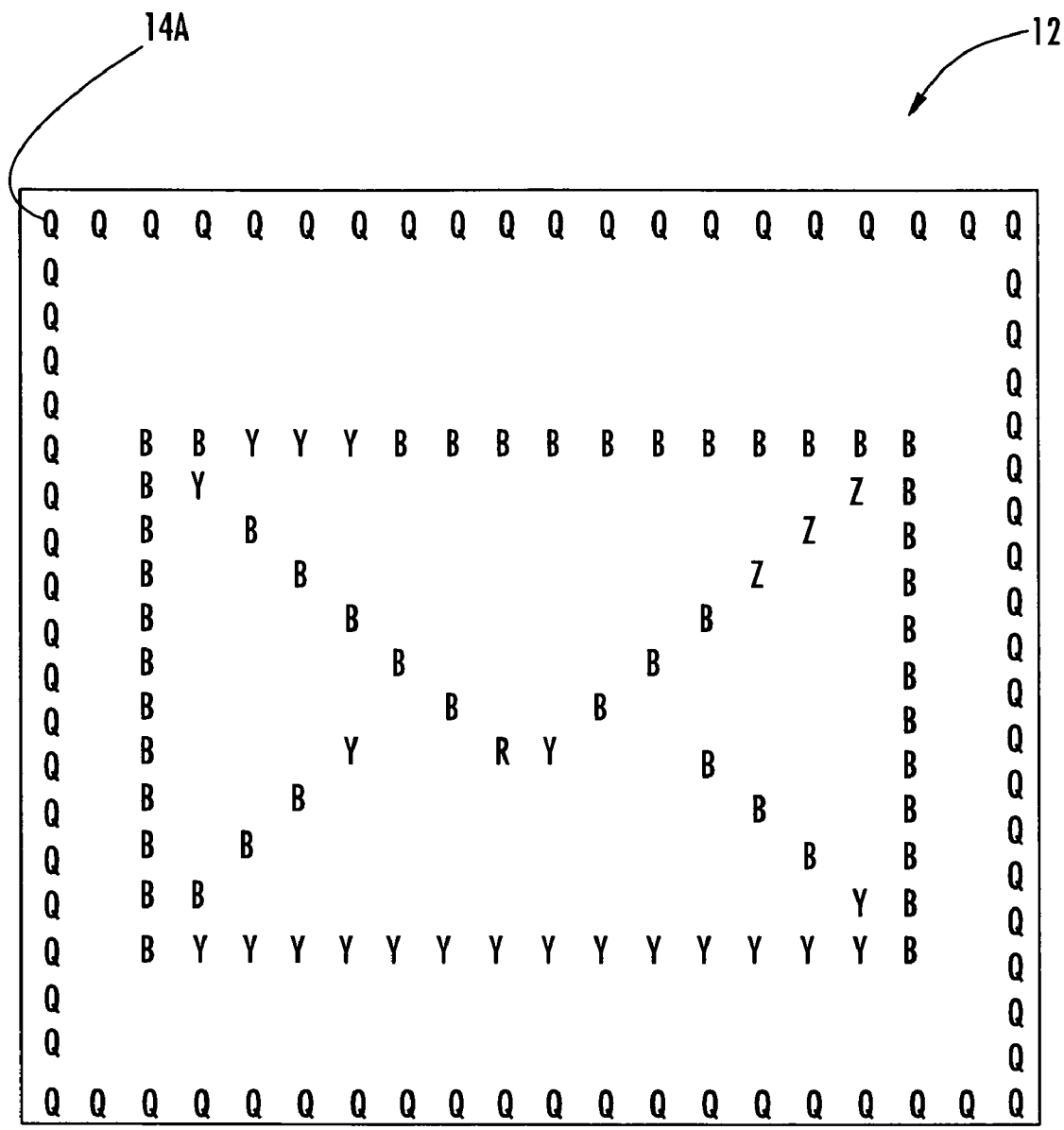

As shown in FIGS. 2A-2C, the respective fiber ends 14A may be arranged on the display surface 12A in an array such that more than one symbol may be illuminated on the display surface 12A by selectively illuminating the fibers 14 with a selected LED 16 and/or a selected color from any multi-wavelength LEDs 16. In FIGS. 2A-2C, the fiber ends marked G are connected to LED G, the fiber ends marked X are connected to LED X and so forth. For example, in FIG. 2A, the fiber ends 14A marked Q, X, G or Z are illuminated green to form an "OK" pattern in green. In FIG. 2B, the fiber ends 14A marked Q, Y, Z or R are illuminated red to form a "camera" pattern in red. In FIG. 2C, the fiber ends 14A marked Q, Y, Z or B are illuminated blue to form an "envelope" pattern. As illustrated, a single pixel of the array of fiber ends 14A may be used for red, blue or green illumination in order to form more than one illustration on the display surface 12A.

In particular, a column 30 of fiber ends 14A marked X in FIGS. 2A and 2B can be illuminated with green light in FIG. 2A to form part of the "O" in "OK." The column 30 may then be illuminated with red light in FIG. 2B to form the left side of a camera symbol. A row 32 in FIGS. 2B and 2C can be illuminated either red in FIG. 2B to form the bottom portion of a camera symbol or green in FIG. 2C to form the bottom portion of an envelope symbol. A square border 34 of fiber ends 14A marked Q in FIGS. 2A-2C may be illuminated green, red or blue to form a green, red or blue boarder in FIGS. 2A, 2B and 2C, respectively.

In this configuration, a plurality of symbols may be illuminated on a single key member 12. In some embodiments, symbols corresponding to various functional modes can be provided and displayed. Moreover, the LEDs 16 may be positioned at any suitable location on an electronic device, such as a mobile terminal, to reduce the space required for the key member 12 of the key 10.

Although the key 10 has been described with single color illumination, it should be understood that the key 10 may be illuminated with more than one color simultaneously. For example, a portion of the display surface 12A may be illuminated with one color and another portion may be illuminated with another color to form one or more symbols. The fiber ends 14A may be arranged on the display surface 12A and connected to various LEDs 16 to form one or more desired symbols or images. It should be understood that virtually any symbol or image may be configured using the fibers 14, display surface 12A and LEDs 16 as described herein.

Portions of the key member 12 and/or display surface 12A of the key 10 may be translucent or transparent. The key member 12 and/or display surface 12A formed of glass, plastic or a polymeric material, and the fiber ends 14A may be embedded therein. Alternatively, the fibers 14 may be melted or bonded together to form the key member 12.

As illustrated in FIGS. 1 and 2, the fibers 14 receive light from one end 14B and emit light from another end 14A. However, other configurations of fiber optic light transmittal may be used.

Figure 3A:
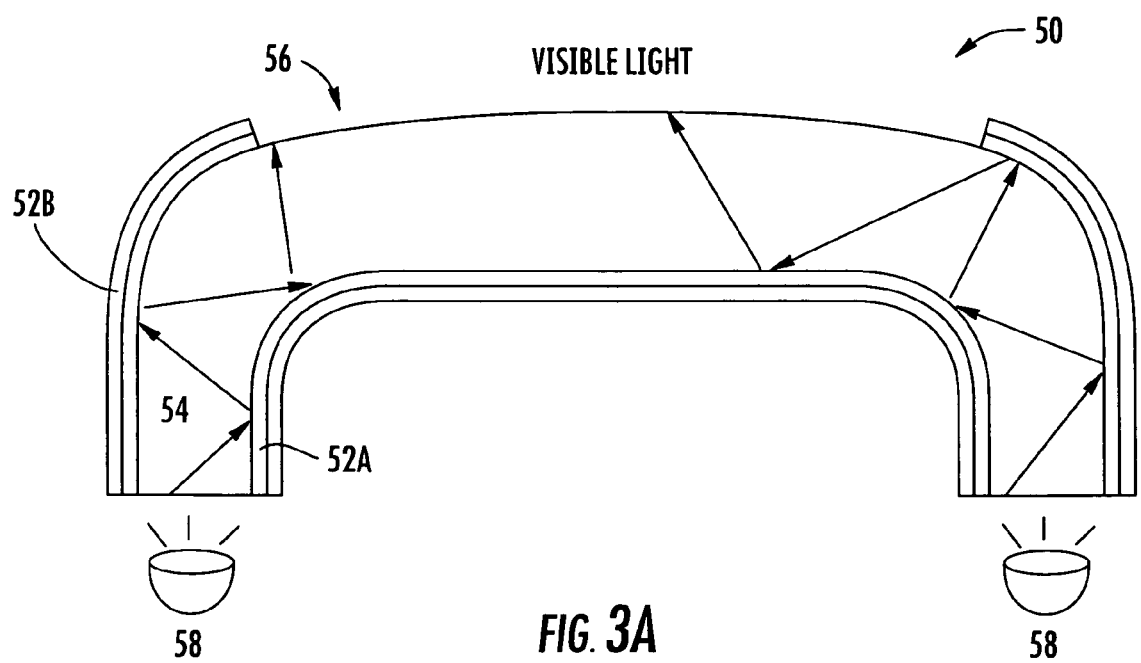
FIG. 3A is an exemplary cross sectional view of a fiber used in the fiber optic key of FIGS. 4A-4D according to some embodiments of the invention.
Figure 3B:
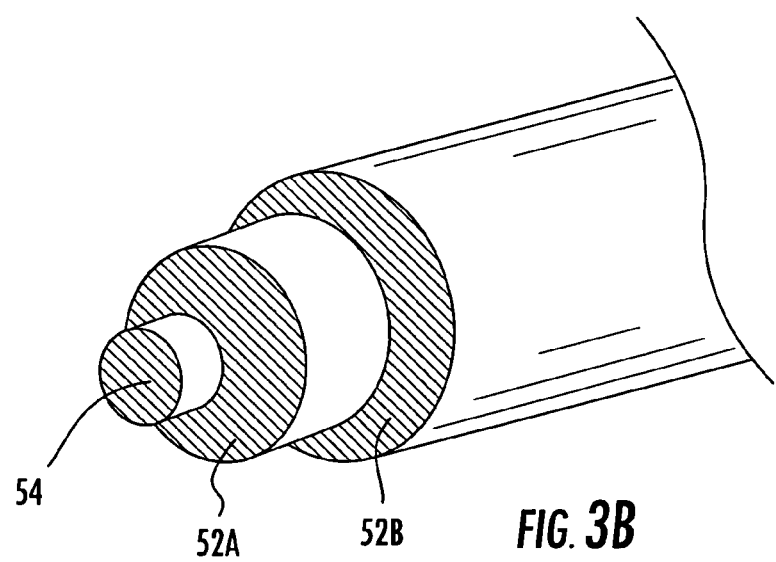
FIG. 3B is a fragmentary, perspective view of the optical fiber of FIG. 3A.

For example, an alternative configuration for emitting light from an optical fiber 50 is shown in FIGS. 3A-3B. The fiber 50 includes an outer fiber sheath 52 that includes a fiber cladding layer 52A and a buffer or coating 52B surrounding the fiber cladding layer 52A. The sheath 52 may be opaque or semi-opaque. The fiber has an interior portion 54 and an open portion 56 that is not covered by the fiber sheath 52. Light sources 58 are positioned at the ends of the fiber 50. Light from the light sources 58 is reflected within the interior portion 54 of the fiber 50 and emitted from the open portion 56 as light. In this configuration, the fiber sheath 52 may be selectively reduced or removed from the fiber 50 to provide a light-emitting portion (e.g., open portion 56).

The operation of optical fibers as described herein will be appreciated by those of skill in the art. Generally, the index of refraction of the cladding layer 52A is lower than that of the interior portion 54 so that light passing through the interior portion 54 is reflected back into the core interior portion 54 by the cladding layer 52A. The light is emitted at the open portion 56. In some alternative embodiments such as is illustrated with respect to FIGS. 1-2, the open portion 56 is closed, i.e., covered with the sheath 52 so that light is emitted at the open ends of the fiber 50.

The interior portion 54 may be formed of a plastic or polymeric material such as polymethyl-methacrylate (PMMA) resin, polystyrene or polycarbonate. The cladding layer 52A may be formed of a plastic or polymeric material such as a fluorinated polymer. The buffer layer 52B may be formed of a plastic or polymeric material such as polyethylene, PCV or nylon. Plastic core optical fibers may provide advantages in cost and flexibility while meeting requirements for strength, signal capacity and signal degredation/loss. A further coating or jacket (not shown) may be applied about the buffer layer 52B.

Figure 4A:
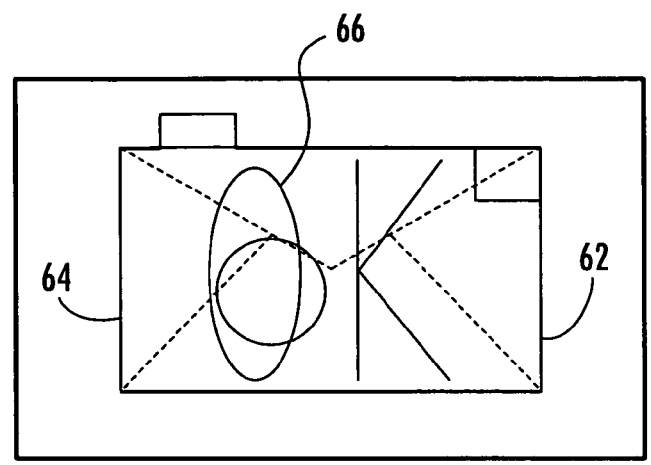
FIGS. 4A-4D are top views of a fiber optic key having various fibers illumination combinations according to some embodiments of the invention.
Figure 4B:
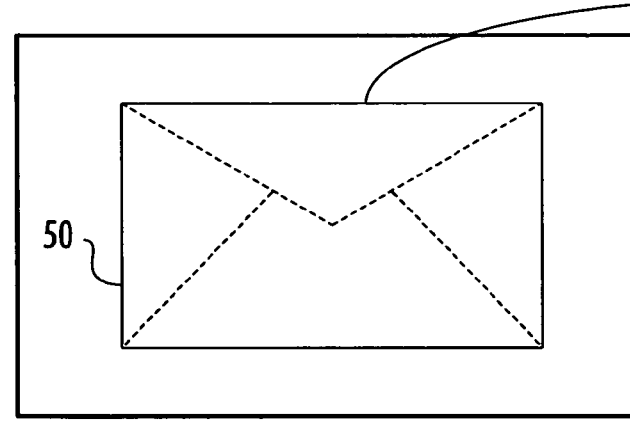
Figure 4C:
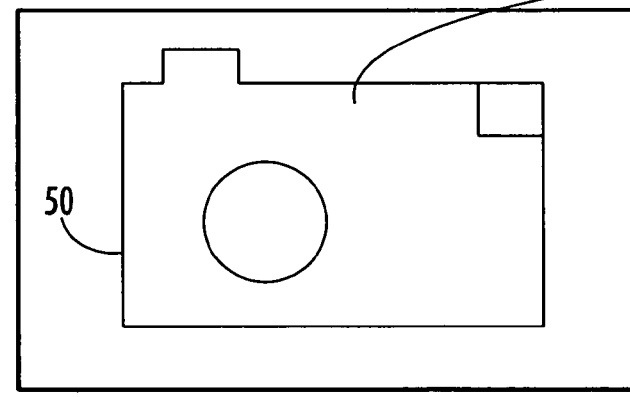
Figure 4D:
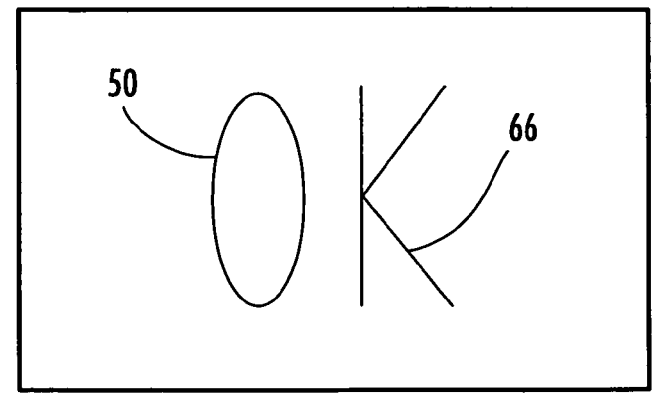

As shown in FIGS. 4A-4D, the fiber 50 of FIG. 3 may be positioned lengthwise along the surface of a key 60 such that the open portion 56 is exposed to emit visible light. The fibers 50 may be selectively illuminated to illustrate different symbols or other images. In FIG. 4A, all of the fibers 50 of the key 60 are illuminated. In FIGS. 4B-4D portions of the fibers 50 are illuminated to alternatively illustrate an envelope symbol 62 (FIG. 4B), a camera symbol 64 (FIG. 4C) and an "OK" symbol 66 (FIG. 4D), respectively, on the key 60. Therefore, more than one symbol may be alternatively illustrated on a single display surface. It should be understood that the symbols 62, 64 and 66 may be the same or different colors.

Although embodiments of the invention have been described with respect to LED light sources, it should be understood that other suitable light sources, such as LCDs, may be used.

Figure 5:
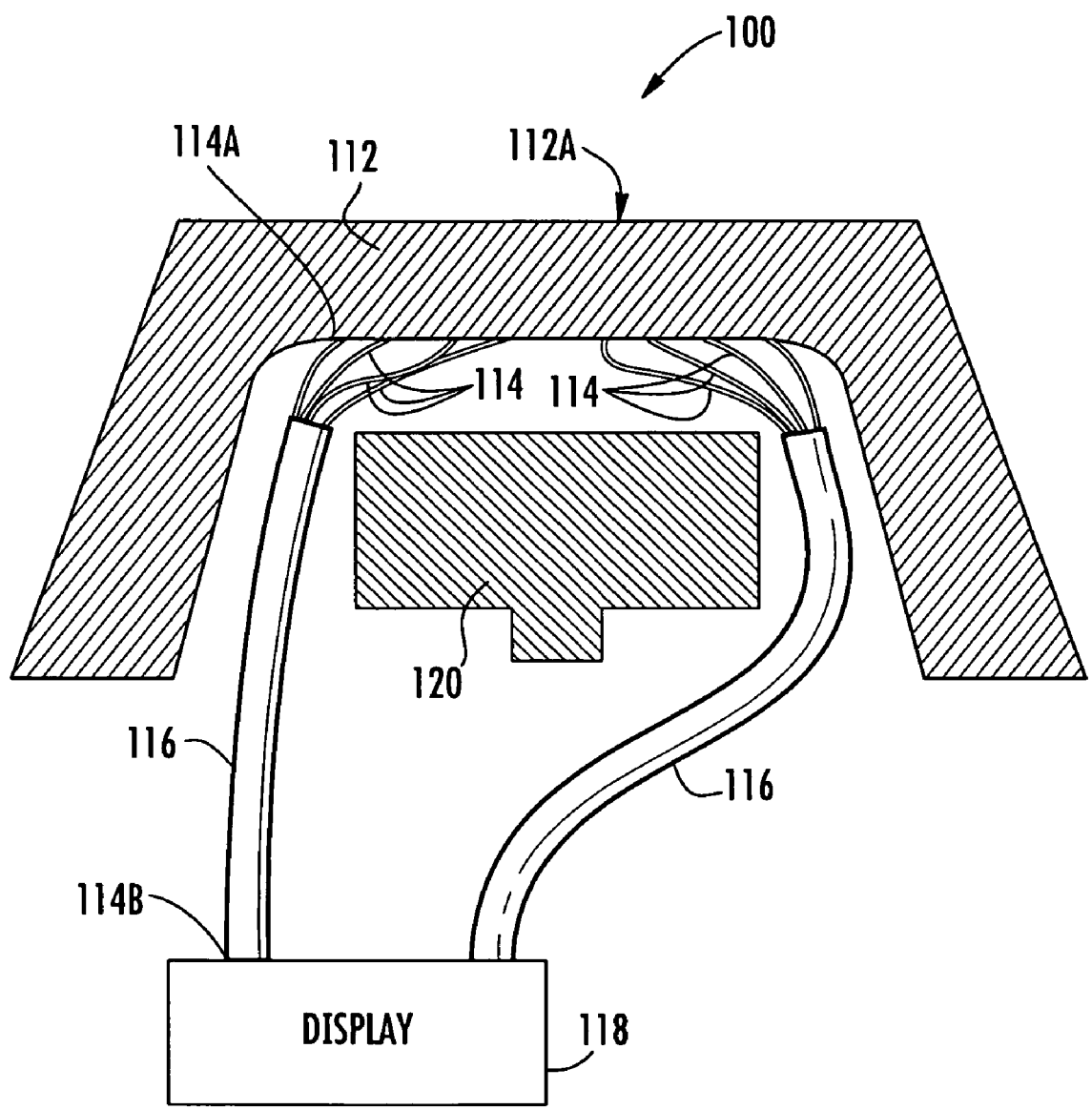
FIG. 5 is a cross sectional view of a fiber optic key according to some embodiments of the invention.

For example, a key 100 that is illuminated with an LCD is shown in FIG. 5. The key 100 includes a key member 112 having a display surface 112A thereon, optical fibers 114, fiber bundles 116, an LCD unit 118 (which includes an LCD 118A and a light source 118B) and a key activator 120. Each fiber 114 includes an end 114A connected to the key member 112 and an end 114B connected to the display 118. When a sufficient force is applied to the key member 112, the key activator 120 is activated to indicate to an electronic device that a user has selected the key.

Some of the fiber ends 114B receive light from illuminated portions of the LCD 118A and transmits that light to the respective fiber ends 114A. Accordingly, a various colors or a single color of light from illuminated portions of the LCD 118A may be transmitted to selected ones of the fiber ends 114A to form an image on the display surface 112A. In this configuration, the LCD unit 118 may be positioned in any suitable location on an electronic device without being confined to the space limitations of the key 100. In particular, the LCD 118A may be larger than the display surface 112A.

Portions of the key member 112 of the key 100 may be translucent or transparent. Portions of the key member 112 may be formed of glass, plastic or a polymeric material, and the fiber ends 114A may be embedded therein. Alternatively, the fibers 114 may be melted or bonded together to form the key member 112.

Figure 6:
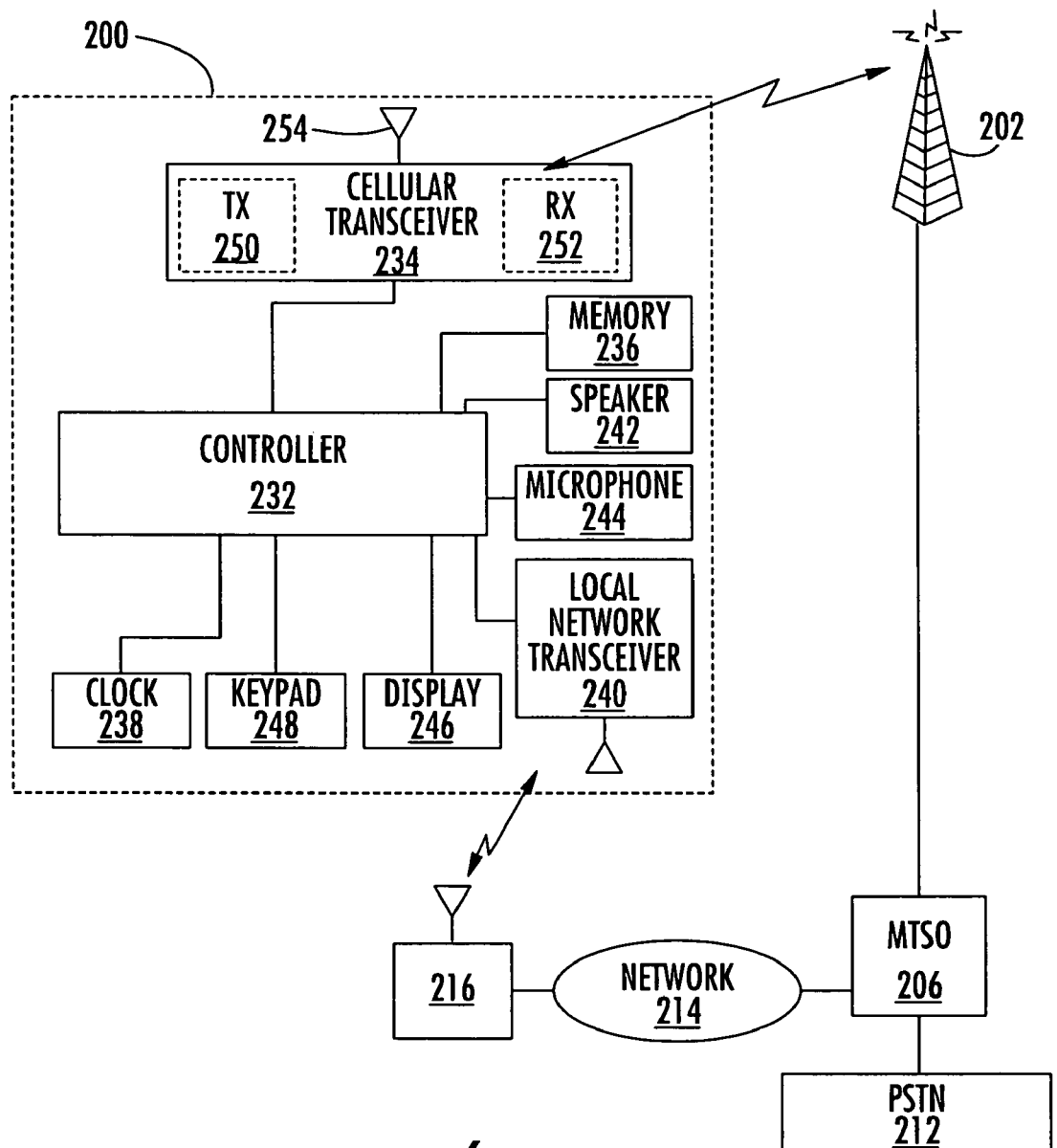
FIG. 6 is a schematic block diagram illustrating a wireless communication system with a wireless terminal according to some embodiments of the invention.

FIG. 6 is a schematic block diagram of a wireless communication system that includes a wireless terminal 200, such as a mobile wireless communications terminal, that receives wireless communication signals from a cellular base station 202 and/or a wireless local network 216. The cellular base station 202 is connected to a MTSO 206, which, in turn, is connected to a PSTN 212, and a network 214 (e.g., Internet). The mobile terminal 200 may communicate with the wireless local network 216 using a communication protocol that may include, but is not limited to, 802.11*a*, 802.11*b*, 802.11*e*, 802.11*g*, 802.11*i*, and/or other wireless local area network protocols. The wireless local network 216 may be connected to the network 214.

In some embodiments of the invention, the mobile terminal 200 includes a controller 232, a cellular transceiver 234, a memory 236, a timing circuit (clock) 238, a local network transceiver 240, a speaker 242, a microphone 244, a display 246 and a keypad 248. The keys 10, 60 and 100 described herein may be used on the keypad 248.

The memory 236 stores software that is executed by the controller 232, and may include one or more erasable programmable read-only memories (EPROM or Flash EPROM), battery backed random access memory (RAM), magnetic, optical, or other digital storage device, and may be separate from, or at least partially within, the controller 232. The controller 232 may include more than one processor, such as, for example, a general purpose processor and a digital signal processor, which may be enclosed in a common package or separate and apart from one another.

In particular, the controller 232 may be configured to control the activation of LEDs or LCDs to illuminate various images on a key as described with respect to FIGS. 1-5, for example, by selectively illuminating a light source. In some embodiments, the controller 232 may illuminate various images on a set of keys corresponding to a mode of operation for a device. For example, in a mobile terminal having a communications mode and a multi-media rendering mode, the controller 232 may illuminate images corresponding to the communications mode (e.g., telephone numbers) or images corresponding to the multi-media mode (e.g., commands such as "play," "volume," etc.) on a set of keys as desired by a user.

The cellular transceiver 234 typically includes both a transmitter (TX) 250 and a receiver (RX) 252 to allow two way communications, but the present invention is not limited to such devices and, as used herein, a "transceiver" may include only the receiver 252. The mobile terminal 200 may thereby communicate with the base station 202 using radio frequency signals, which may be communicated through an antenna 254. For example, the mobile terminal 200 may be configured to communicate via the cellular transceiver 234 using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and Universal Mobile Telecommunications System (UMTS). Communication protocols as used herein may specify the information communicated, the timing, the frequency, the modulation, and/or the operations for setting-up and/or maintaining a communication connection. In some embodiments, the antennas 228 and 254 may be a single antenna.

Figure 7:
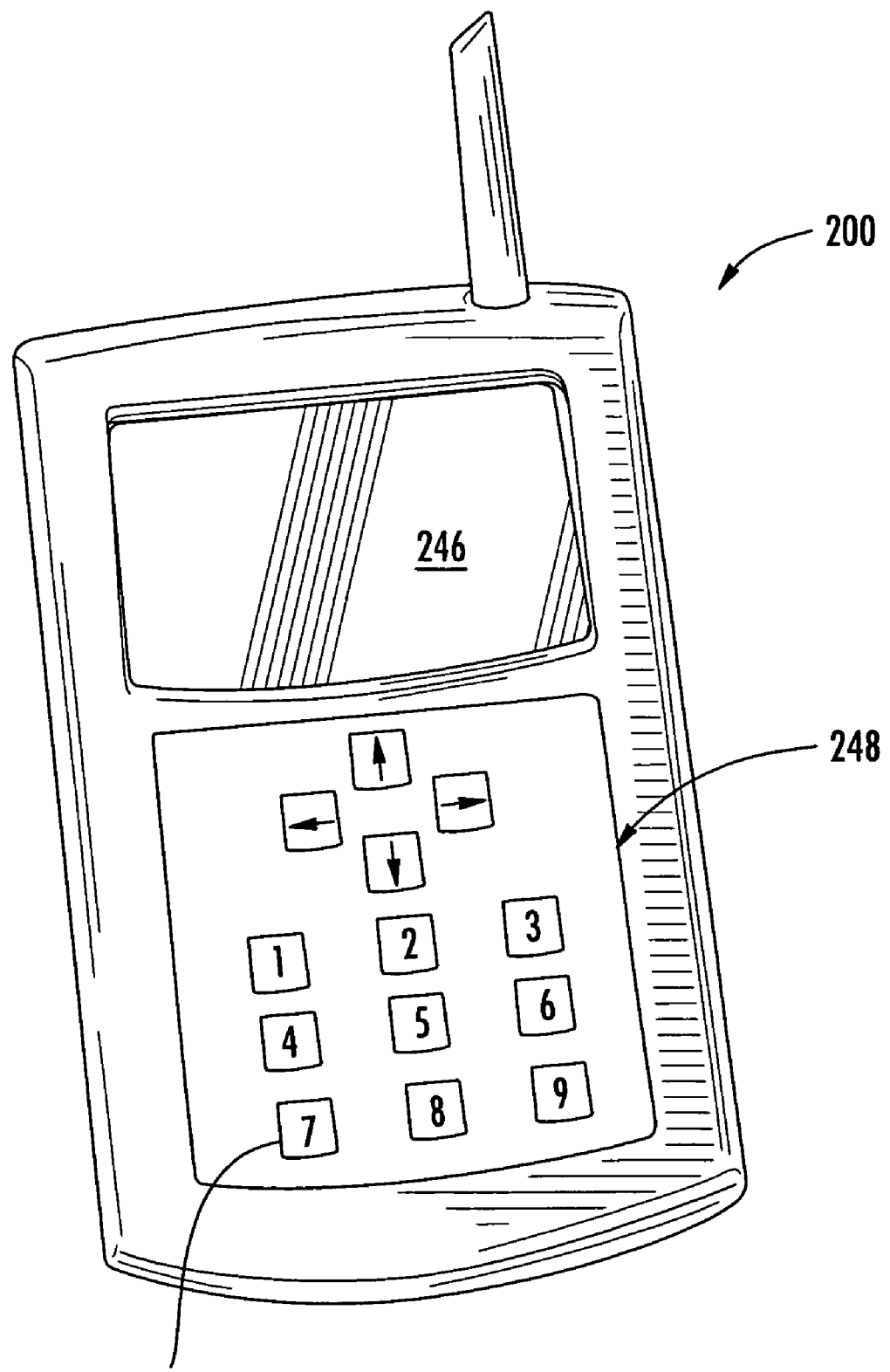
FIG. 7 is a front view of the wireless terminal of FIG. 6.

As shown in FIG. 7, the keypad 248 of the mobile terminal 200 can include button keys 290. The keys 290 can be configured as described herein with respect to the keys 10, 60, and 100.

Although embodiments according to the current invention have been described with respect to the keypad 248 of the mobile terminal 200, it should be understood that the keys 10, 60, and 100 described herein may be used in any suitable electronic device. The keys 10, 60, 100 can also be used on the mobile terminal 200 for buttons or keys other than those on the keypad 248. Moreover, embodiments according to the current invention are not limited to any particular size or display environment and may be used in other displays or signs as would be understood by those of skill in the art. However, in particular embodiments, the optical fibers have a diameter of about 0.15 mm.

Although embodiments according to the current invention have been described with respect to an LED or LCD that provides light to an optical fiber, it should be understood that other configurations may be used, including configurations using optical switches to selectively provide light to an array of optical fibers.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

What is claimed is:

1. A display system comprising:
   a display surface;
   at least one light source;
   a plurality of optical fibers configured to transmit light from the at least one light source to the display surface; and
   a controller configured to control the at least one light source to selectively provide each of first and second alternative images at the display surface, wherein the plurality of optical fibers each includes a longitudinal sheath that is selectively reduced or removed to provide a light-emitting portion positioned at the display surface.

2. The display system of claim 1, further comprising a key member, wherein the display surface is configured to display the first and second alternative images on the key member.

3. The display system of claim 2, further comprising a key activator configured to activate when a force is applied on the key member in a direction towards the key activator.

4. The display system of claim 1, further comprising an LCD unit including an LCD and the at least one light source, wherein each of the plurality of optical fibers are configured to transmit light from a portion of the LCD to the display surface.

5. The display system of claim 4, wherein the LCD has an area that is larger than an area of the display surface.

6. The display system of claim 4, wherein one of the ends of the optical fibers is configured to emit light at the display surface.

7. The display system of claim 4, wherein the controller is configured to control illumination of the LCD to thereby provide the first and second images on the display surface.

8. The display system of claim 1, wherein the light source includes a plurality of light sources connected to respective ones of the plurality of optical fibers.

9. The display system of claim 8, wherein the controller is configured to selectively illuminate ones of the plurality of light sources to thereby provide the first and second images.

10. The display system of claim 9, wherein one end of the plurality of optical fibers is configured to emit light from the light source at the display surface.

11. The display system of claim 10, wherein the plurality of light sources includes at least one multi-wavelength light source that emits a plurality of light wavelengths and the controller is further configured to select one of the plurality of light wavelengths emitted by the multi-wavelength light source.

12. The display system of claim 8, wherein the plurality of light sources are LEDs.

13. The display system of claim 1, wherein the display surface comprises a transparent material having portions of the optical fibers embedded therein.

14. The display system of claim 1, wherein portions of the optical fibers are connected together to form the display surface.

15. A method of displaying images in a display system, the display system comprising: a display surface; at least one light source; and a plurality of optical fibers configured to transmit light from the at least one light source to the display surface, the method comprising:

controlling the at least one light source to provide a first image at the display surface;

thereafter controlling the at least one light source to provide a second alternative image at the display surface wherein the plurality of light sources each includes at least one multi-wavelength light source that emits a plurality of light wavelengths, and the light source includes a plurality of light sources, the plurality of optical fibers each including a longitudinal sheath, the method further comprising:

selectively illuminating ones of the plurality of light sources to thereby provide the first and second images at the display surface;

selecting one of the plurality of light wavelengths emitted by the multi-wavelength light source; and selectively reducing and/or removing the longitudinal sheath of the plurality of optical fibers to provide a light-emitting portion positioned at the display surface.

16. The method of claim 15, wherein the display system further comprises an LCD unit including an LCD and the at least one light source, the method further comprising transmitting light from portions of the LCD via the optical fibers.

17. The method of claim 15, further comprising emitting light from respective ends of the optical fibers at the display surface.

18. The method of claim 16, further comprising controlling illumination of the LCD unit to provide the first and second images at the display surface.

19. A mobile terminal including a button key system, the button key system comprising a key member having a display surface, wherein the key system further comprises:

at least one light source;

a plurality of optical fibers configured to transmit light from the at least one light source to the display surface; and a controller configured to control the at least one light source to selectively provide each of first and second alternative images at the display surface, wherein the plurality of optical fibers each includes a longitudinal sheath that is selectively reduced or removed to provide a light-emitting portion positioned at the display surface.

* * * * *

UNITED STATES PATENT AND TRADEMARK OFFICE
CERTIFICATE OF CORRECTION

| | | |
|---|---|---|
| PATENT NO. | : 7,866,866 B2 | Page 1 of 1 |
| APPLICATION NO. | : 11/281031 | |
| DATED | : January 11, 2011 | |
| INVENTOR(S) | : Wahlstrom | |

It is certified that error appears in the above-identified patent and that said Letters Patent is hereby corrected as shown below:

<u>On the Title Page:</u>
Item (73) Assignee: Please correct "Mible" to read -- Mobile --

Signed and Sealed this
Fifth Day of July, 2011

David J. Kappos
*Director of the United States Patent and Trademark Office*